United States Patent [19]

Wakabayashi et al.

[11] Patent Number: 5,572,283
[45] Date of Patent: Nov. 5, 1996

[54] DISPLAY ILLUMINATION DEVICE FOR CAMERA

[75] Inventors: Hiroshi Wakabayashi, Yokohama; Daiki Tsukahara, Hiratsuka; Hidenobu Kaji, Kawasaki; Tadashi Ohtani, Ohtawara, all of Japan

[73] Assignee: Nikon Corporation, Tokyo, Japan

[21] Appl. No.: 343,959

[22] Filed: Nov. 17, 1994

[30]    Foreign Application Priority Data

Nov. 29, 1993  [JP]  Japan ................................. 5-298042
Nov. 29, 1993  [JP]  Japan ................................. 5-298043

[51] Int. Cl.⁶ ................................................. G03B 17/18
[52] U.S. Cl. ..................... 396/279; 396/281; 396/287; 396/296
[58] Field of Search .................. 354/468, 471, 354/472, 473, 474, 475, 289.1, 289.12, 484, 465

[56]    References Cited

U.S. PATENT DOCUMENTS

| 4,142,786 | 3/1979 | Suzuki et al. | 354/472 |
| 4,643,550 | 2/1987 | Kitagawa et al. | 354/289.1 |
| 4,692,014 | 9/1987 | Kiuchi | 354/471 |
| 4,949,118 | 8/1990 | Yamamoto et al. | 354/475 |
| 5,386,265 | 1/1995 | Sakamoto | 354/484 |
| 5,432,578 | 7/1995 | Suzuki | 354/289.12 |

*Primary Examiner*—W. B. Perkey
*Attorney, Agent, or Firm*—Oliff & Berridge

[57]    ABSTRACT

A camera is provided with several displays illuminated by several illuminators which are controlled to be turned on and off in dependence upon the operation of several illuminator buttons. Further, the brightness of the illuminators, when turned on, may be determined according to the operation of the illuminator buttons and according to the brightness of the object to be photographed.

14 Claims, 10 Drawing Sheets

| BUTTON OPERATED / ILLUMINATOR | FIRST ILLUMINATOR BUTTON 3 | SECOND ILLUMINATOR BUTTON 8 |
|---|---|---|
| ILLUMINATOR 1a FOR POINTER TYPE DISPLAY 1 | ON | OFF |
| ILLUMINATOR 2a FOR VIEWFINDER DISPLAY 2 | ON | ON (BRIGHT) |

| BRIGHTNESS VALUE Bv OF OBJECT TO BE PHOTOGRAPHED | TURNED ON BY FIRST STROKE DEPRESSION OF SHUTTER RELEASE BUTTON 4 | | TURNED ON BY OPERATION OF FIRST ILLUMINATOR BUTTON 3 | | TURNED ON BY OPERATION OF SECOND ILLUMINATOR BUTTON 8 | |
|---|---|---|---|---|---|---|
| | ILLUMINATOR 2a FOR VIEWFINDER DISPLAY 2 | ILLUMINATOR 1a FOR ROTATING POINTER TYPE DISPLAY 1 | ILLUMINATOR 2a FOR VIEWFINDER DISPLAY 2 | ILLUMINATOR 1a FOR ROTATING POINTER TYPE DISPLAY 1 | ILLUMINATOR 2a FOR VIEWFINDER DISPLAY 2 | ILLUMINATOR 1a FOR ROTATING POINTER TYPE DISPLAY 1 |
| $2 < Bv$ | OFF | OFF | ON AT HIGH LEVEL | OFF | ON AT HIGH LEVEL | OFF |
| $0 < Bv \leq 2$ | ON AT LOW LEVEL | OFF | ON AT LOW LEVEL | OFF | ON AT LOW LEVEL | OFF |
| $Bv \leq 0$ | ON AT LOW LEVEL | OFF | ON AT LOW LEVEL | ON | ON AT LOW LEVEL | ON |

DISPLAY ILLUMINATION DEVICE FOR CAMERA

BACKGROUND OF THE INVENTION

1. Field of the Invention

The present invention relates to a display illumination device for illuminating a plurality of display devices fitted to a camera.

2. Description of the Related Art

A camera, which comprises a viewfinder within which a liquid crystal type display device is internally incorporated for conveniently displaying the current values of various parameters relating to photography while the camera user is looking through the viewfinder, is per se known. A camera, on the upper surface or on the rear surface of the body of which there is externally fitted a liquid crystal type display device or a rotating indicator pointer type display device for similarly displaying the current values of various parameters relating to photography while the camera user is looking at the exterior of the camera, is also per se known. It is also per se conventional to provide an illuminator for illuminating such a display device in conditions in which the ambient light level is not sufficient for naturally illuminating the display device well enough for it to be read easily, and the further provision of an illuminator control button for manually turning on such an illuminator when so desired is also per se known.

SUMMARY OF THE INVENTION

A primary objective of the present invention is to propose a display illumination device which is capable of illuminating a plurality of display devices fitted to a camera by the operation of several different control members.

In order to attain this objective, the present invention proposes, according to a first aspect thereof, a display illumination device for a camera which comprises a plurality of display devices which display information related to photography, comprising: a plurality of illuminators, provided in correspondence to said display devices, which illuminate said display devices; a plurality of illuminator control buttons for turning on and off said illuminators; and a control device which controls said plurality of illuminators according to the operation of said plurality of illuminator control buttons.

For example, the control device may turn off the plurality of illuminators when at least two among the plurality of illuminator control buttons are operated simultaneously. Alternatively, when a second one of the plurality of illuminator control buttons is operated while a first one thereof is being operated, the control device may switch over the brightness levels at which the plurality of illuminators are illuminated upon each operation of this second illuminator control button. Or, alternatively, provided that the camera includes a battery and a detector to detect the amount of electrical power remaining in the battery, then, when at least two among the plurality of illuminator control buttons are operated simultaneously, the control device may illuminate the plurality of illuminators at brightness levels determined according to the amount of electrical power remaining in the battery as detected by the detector. Yet again, as another alternative, the control device may set any one from among a plurality of functions of the camera, according to the manner of operation of at least two from among the plurality of illuminator control buttons.

By this construction it is possible to turn on and off the plurality of illuminators, in whatever attitude the camera is held and whichever one of the illuminator buttons is operated; and accordingly the operability of the camera is enhanced. Further, by operating this plurality of illuminator buttons appropriately in unison, it is possible to turn off all of the illuminators off or on together, to change over the intensity by which they are lit up, to display the amount of energy remaining in the battery of the camera, or to perform setting of various functions of the camera.

Another objective of the present invention is to propose a display illumination device which is capable of illuminating a plurality of display devices fitted to a camera at brightness levels which are the most appropriate ones in consideration of the ambient light level.

In order to attain this further objective, the present invention proposes, according to a second aspect thereof, a display illumination device for a camera which comprises a plurality of display devices which display information related to photography, comprising: a plurality of illuminators, provided in correspondence to said display devices, which illuminate said display devices; a plurality of illuminator control buttons for turning on and off said illuminators; a photometric device which detects the brightness of an object to be photographed, and a control device which controls said plurality of illuminators based upon the operation of said plurality of illuminator control buttons and upon the brightness of the object to be photographed as detected by said photometric device.

According to this second aspect of the present invention as described above, the turning on and off of the plurality of illuminators, and optionally the brightness level thereof when they are turned on, is controlled based upon the operation of the plurality of illuminator control buttons and upon the brightness of the object to be photographed as detected by the photometric device. By doing this, the turning on and off of the illuminators, and optionally their brightness levels when on, can be controlled in the most suitable manner in dependence upon the ambient lighting conditions. Thereby the viewability of the display devices is improved, and also consumption of the battery power can be minimized.

DESCRIPTION OF THE PREFERRED EMBODIMENTS

Preferred Embodiment 1

The first preferred embodiment of the present invention will now be explained with reference to FIGS. 1 through 6.

Figure 1:
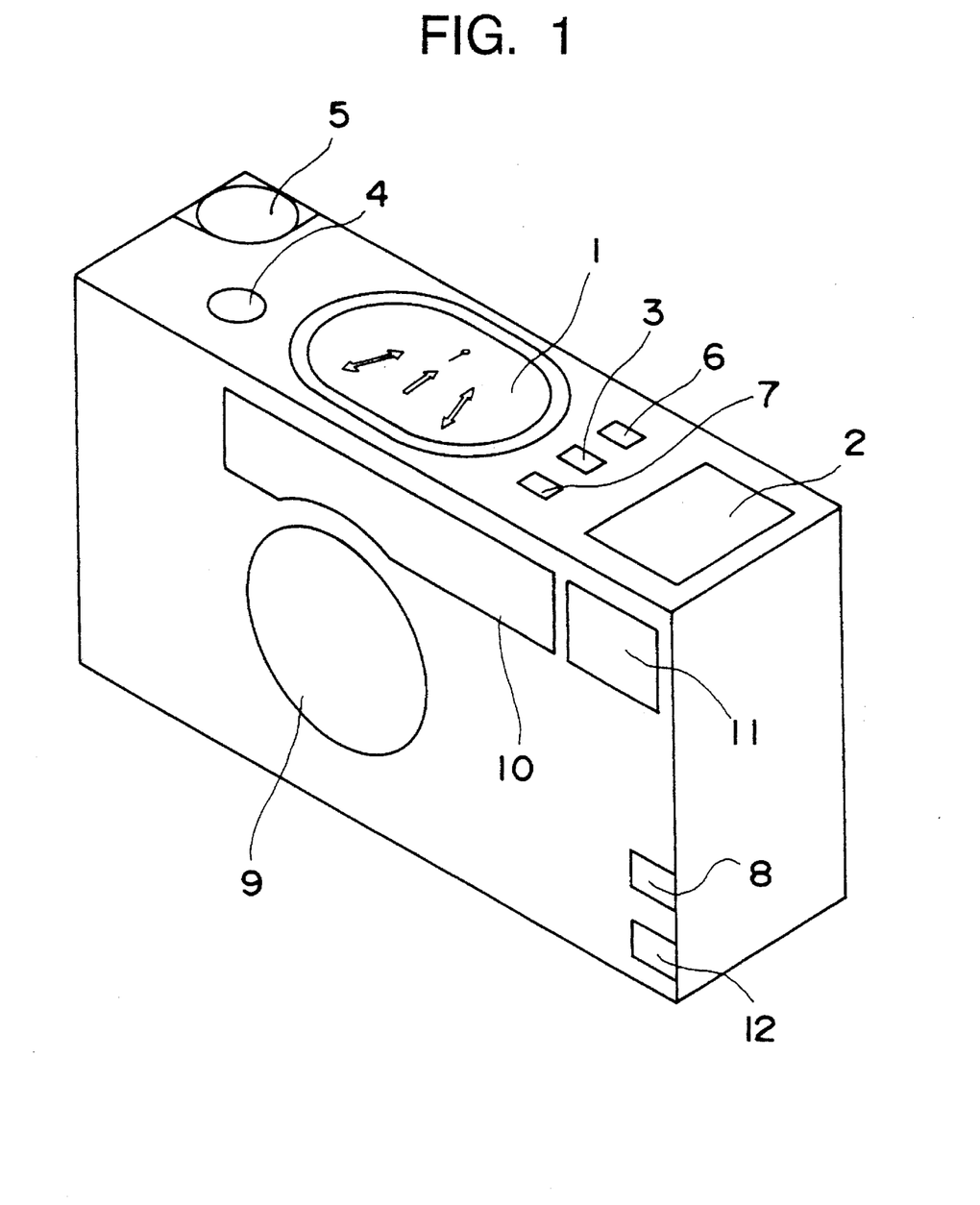
FIG. 1 is a perspective view of a camera which is equipped with the first preferred embodiment of the display illumination device of the present invention.

FIG. 1 is a perspective view of a camera which is equipped with the first preferred embodiment of the display illumination device of the present invention.

On the upper surface of the main body of this camera there is provided a rotating indicator pointer type display device 1 for displaying the current values of various items of information related to photography. Within the viewfinder of this camera there are provided a photographic field frame mark, an auto focus frame mark, and a liquid crystal type viewfinder display device 2, also for displaying the current values of various items of information related to photography. Near the rotating indicator pointer type display device 1 on the upper surface of the camera main body there is provided a first illuminator button 3 for turning on display illuminators 1a and 2a to be described hereinafter which are respectively provided in the rotating indicator pointer type display device 1 and in the liquid crystal type viewfinder display device 2. And on the upper surface of the camera main body there are further provided a shutter release button 4, a command knob 5 for setting the values of various parameters for photography, a focus mode setting button 6 for setting the focusing mode, an exposure compensation value setting button 7, and the like.

On the other hand, near a grip portion on the left side of the camera main body there is provided a second illuminator button 8 for turning on the display illuminators 1a and 2a for the display devices 1 and 2 respectively. This second illuminator button 8 is arranged so as to be capable of being easily actuated when the user is holding the camera in its proper orientation and is looking through the viewfinder thereof, i.e. so as to come naturally to hand when the camera is being held ready for photography. Further, there are provided on the front face of the camera main body a photographic lens 9, a viewfinder window 10, a flash device 11, a flash prevention button 12 for preventing the flash device 11 from operating, and the like.

However, it should be understood that the positions of the first and second illuminator buttons 3 and 8 are not to be considered as being limited by the above description.

Figure 2:
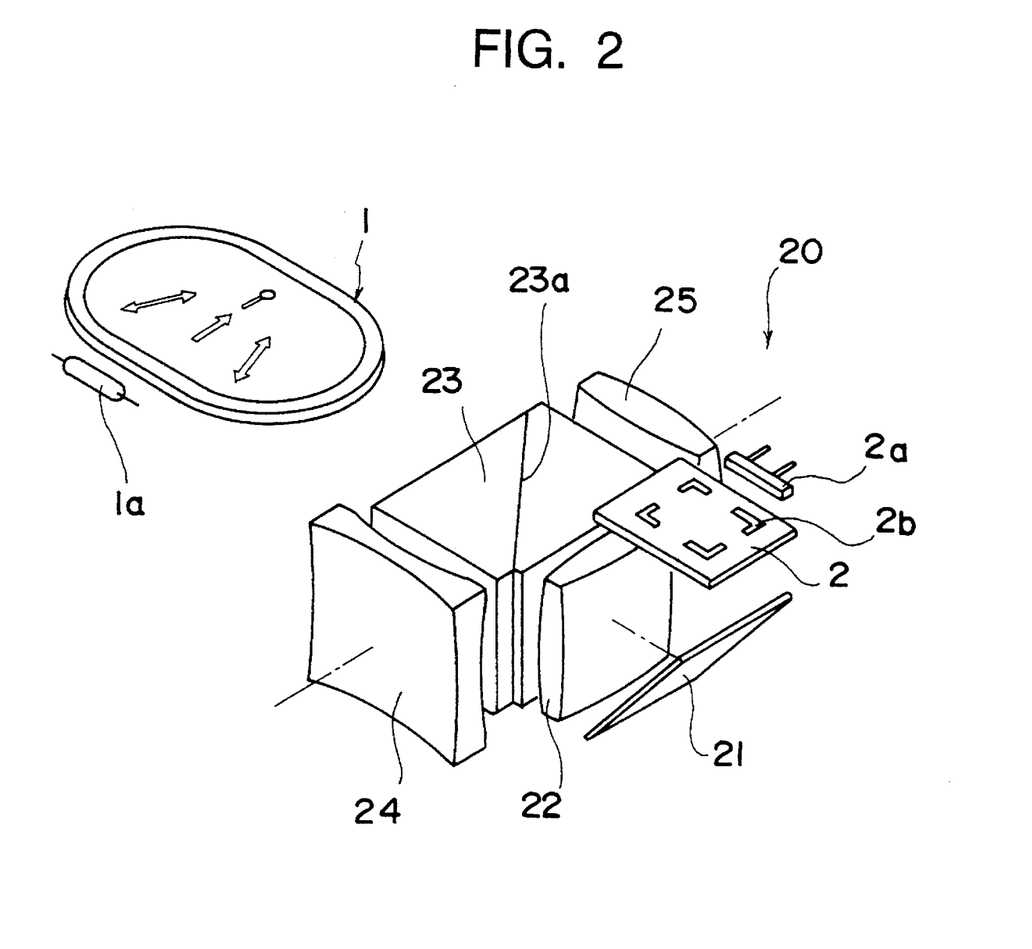
FIG. 2 is a perspective view showing the construction of a rotating indicator pointer type display device, of a viewfinder, and of a liquid crystal type viewfinder display device of the camera shown in FIG. 1.

FIG. 2 is a perspective view showing the construction of the rotating indicator pointer type display device 1, of the viewfinder, and of the viewfinder display device 2, incorporated in the camera shown in FIG. 1.

In the rotating indicator pointer type display device 1 a plurality of rotating indicator pointers are rotationally positioned over scale plates so as to display the current values of various items of information related to photography, such as film frame number, iris opening (aperture), photographic distance, exposure compensation value, and the like. The rotating indicator pointer type display device 1 is provided with an illuminator 1a for illuminating it.

On the other hand, the viewfinder (denoted overall as 20) is a reverse-Galilean finder which is equipped with a light intake type bright frame mark, and which takes in external light through a light intake window provided on the upper surface of the main body of the camera, so as to illuminate the photographic field frame mark, the auto focus frame mark, and the photographic information etc. of the photographic crystal type viewfinder display device 2. Since during the evening or in a dark location the amount of illumination thus provided by the external light taken in by this viewfinder 20 through the light intake window is not sufficient, an illuminator 2a is provided for additionally illuminating the photographic field frame mark, the auto focus frame mark, and the photographic information mark etc.. The viewfinder display device 2 is a negative type liquid crystal display, and the external light taken in through the light intake window passes through the negative type segment portions 2b which make up the photographic field frame mark etc.. This transmitted light is reflected by a mirror 21, passes through a lens 22, and is reflected by a beam splitter portion 23a of a prism 23. Further, this reflected light is superimposed upon an image of the object to be photographed which has entered through the viewfinder window 10 and has passed through an objective lens 24, and is directed through an eyepiece lens 25 so as to enter the eyeball of the user of the camera.

Figure 3:
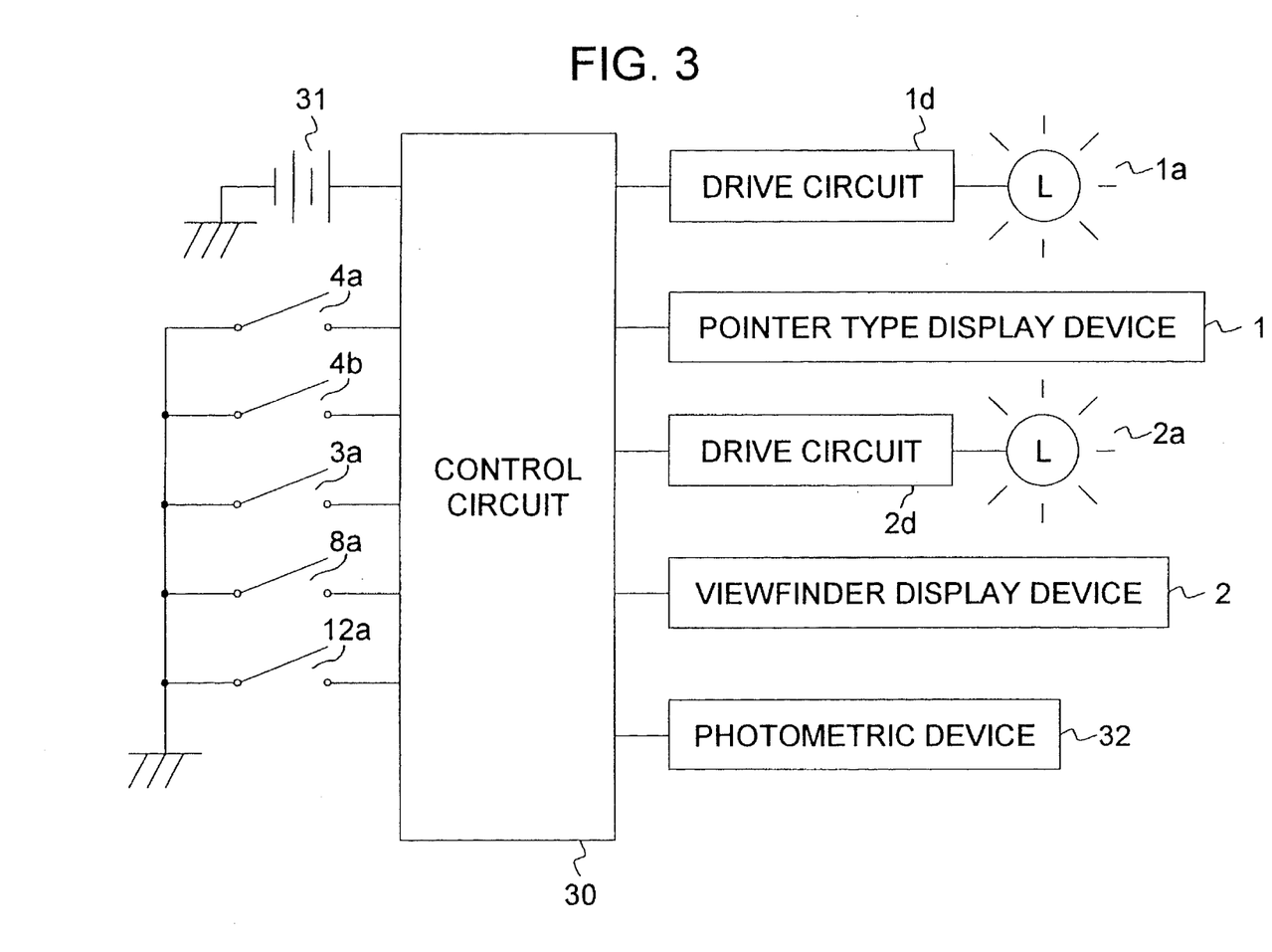
FIG. 3 is a functional block diagram showing the overall construction of the first preferred embodiment of the display illumination device of the present invention.

FIG. 3 is a functional block diagram showing the overall construction of the first preferred embodiment of the display illumination device of the present invention.

A control circuit 30 incorporates a microcomputer (not particularly shown) and various associated circuitry and performs overall sequence control for this camera. In particular switches 4a, 4b, 3a, 8a, and 12a are connected to this control circuit 30.

The switches 4a and 4b are turned on and off in association with the operation of the shutter release button 4: when the shutter release button 4 is partially depressed at least as far as a first stroke position thereof, the first stroke switch 4a is turned on; and, when the shutter release button 4 is fully depressed to a second stroke position thereof which is further down than its first stroke position, the second stroke switch 4b is turned on. The switch 3a is turned on and off in association with the operation of the first illuminator button 3: when the first illuminator button 3 is depressed, the switch 3a is turned on. The switch 8a is turned on and off in association with the operation of the second illuminator button 8: when the second illuminator button 8 is depressed, the switch 8a is turned on. And the switch 12a is turned on and off in association with the operation of the flash prevention button 12: when the flash prevention button 12 is depressed, the switch 12a is turned on.

To the control circuit 30 there are further connected respective drive circuits 1d and 2d for the illuminators 1a and 2a of the display devices 1 and 2, a battery 31, and a photometric device 32. The battery 31 supplies operating electrical power to the various mechanisms of the camera including the control circuit 30, the drive circuits 1d and 2d, the display devices 1 and 2, and the like. And the photometric device 32 measures the brightness level of the light from the object to be photographed which enters through the viewfinder window 10, and a target brightness value Bv is derived therefrom.

Figure 4:
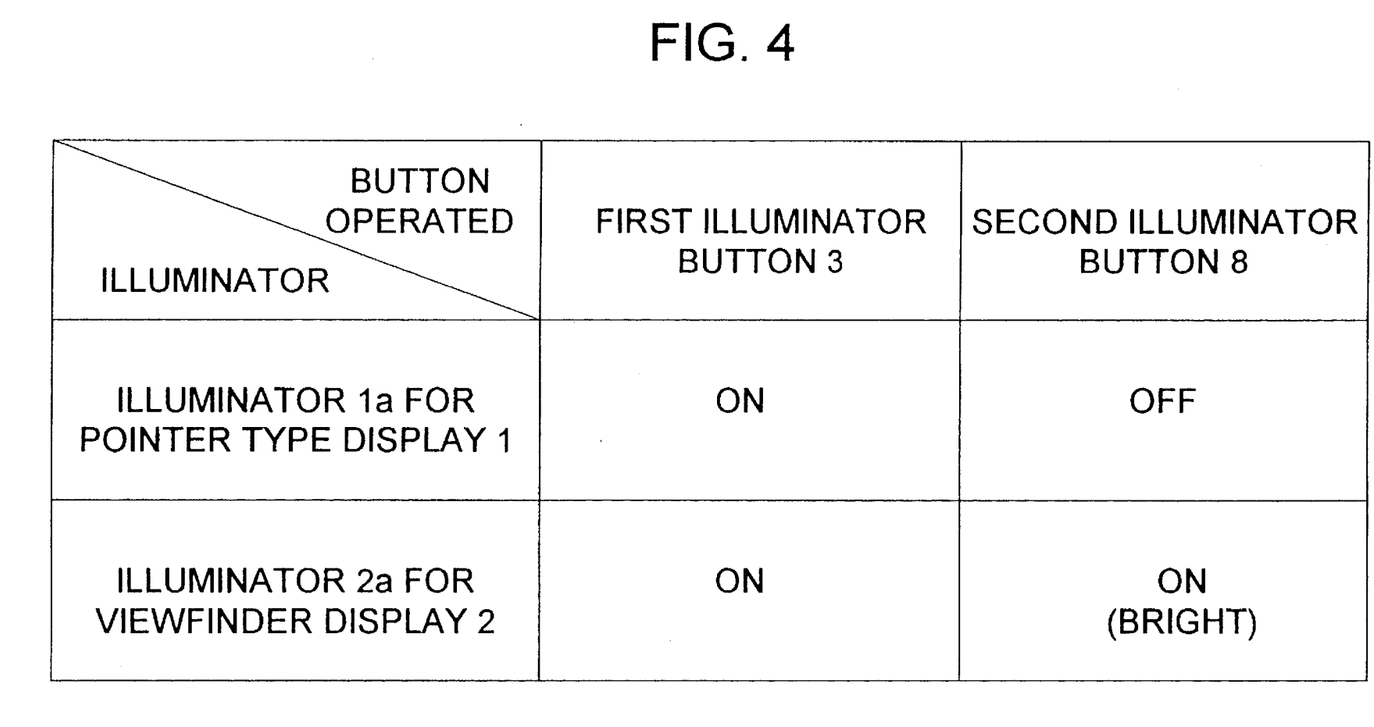
FIG. 4 is a table showing how the on/off states of two illuminators and the brightness level of one of them depend upon the operation of first and second illuminator buttons, according to the operation of this first preferred embodiment.

The respective illuminators 1a and 2a for the rotating indicator pointer type display device 1 and for the viewfinder display device 2 are turned on and off according to the operation of the first illuminator button 3 and the second illuminator button 8, according to the table shown in FIG. 4.

When the first illuminator button 3 which is provided near the rotating indicator pointer type display device 1 is pressed, both the illuminator 1a for the rotating indicator pointer type display device 1 and also the illuminator 2a for the viewfinder display device 2 are turned on. On the other hand, since it is likely, when the second illuminator button 8 which is provided near the grip portion on the left side of the camera main body is pressed, that the user of the camera is looking through the viewfinder, therefore it is assumed that it is not necessary to illuminate the rotating indicator pointer type display device 1 at this time, so that the illuminator 1a is not turned on; but instead only the illuminator 2a for the viewfinder display device 2 is turned on. Moreover, as shown in the FIG. 4 table, it is desirable (although not necessary for the principle of the present invention) for the brightness level of this illuminator 2a to be increased at this time, in order to provide a higher level of illumination for the viewfinder display device 2.

Next, referring to the flow chart shown in FIG. 5, the procedure followed by the microcomputer incorporated in the control circuit 30 for controlling the turning on and off of the illuminators 1a and 2a, according to this first preferred embodiment of the present invention, will be explained.

Figure 5:
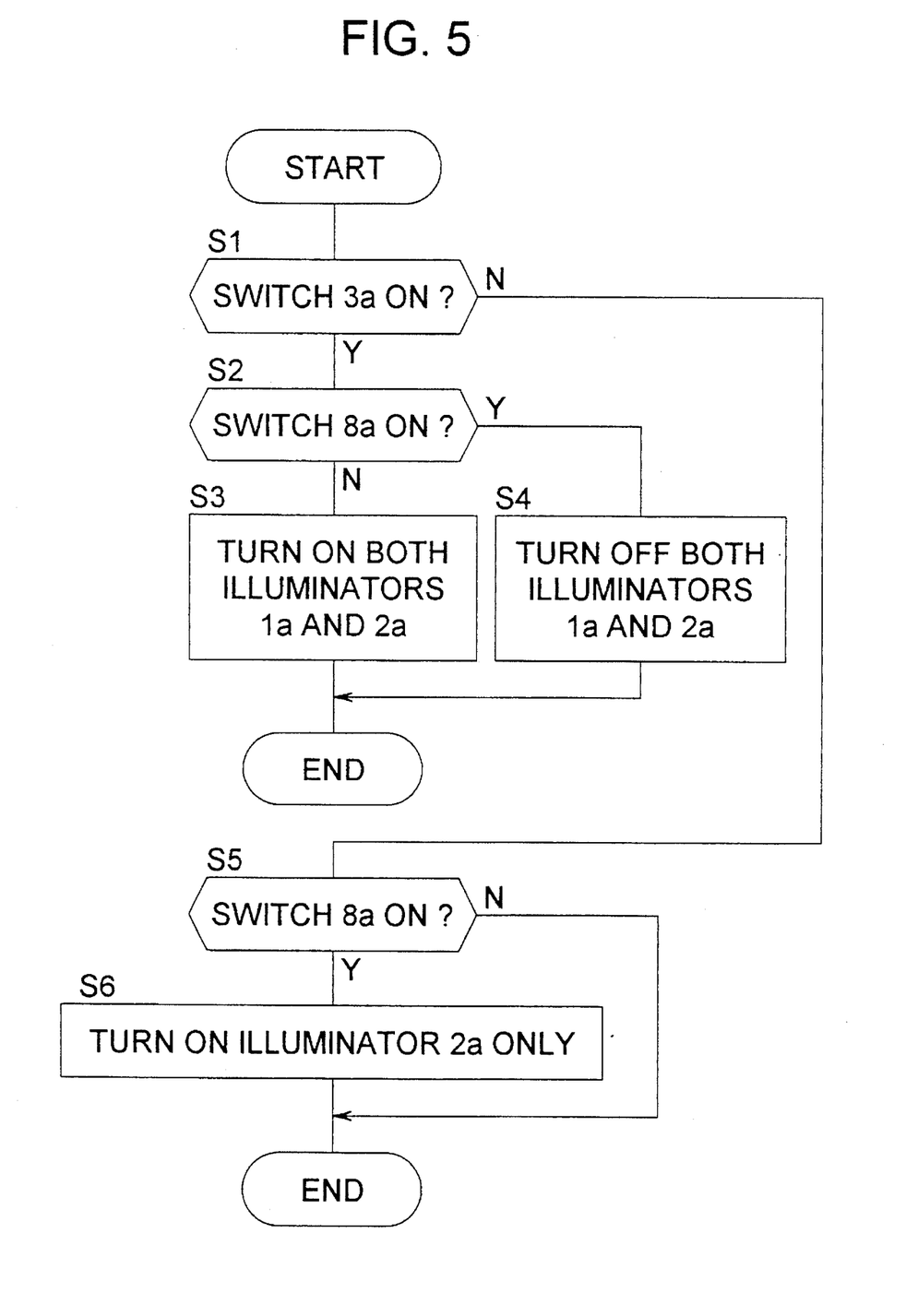
FIG. 5 is a flow chart showing the procedure followed by a control circuit for controlling the turning on and off of these illuminators, according to this first preferred embodiment of the present invention.

The microcomputer incorporated in the control circuit 30 starts to execute the control program whose flow chart is shown in FIG. 5 when the switch 3a or the switch 8a is turned on. In the step S1, a decision is made as to whether or not the switch 3a is on, that is, as to whether or not the first illuminator button 3 is being depressed. If the first illuminator button 3 is being depressed, then the flow of control continues to the step S2, while if not then the flow of control is transferred to the step S5. When the first illuminator button 3 is being depressed, in the step S2 a decision is made as to whether or not the switch 8a is on, that is, as to whether or not the second illuminator button 8 is being depressed. If the second illuminator button 8 is being depressed, then the flow of control is transferred to the step S4, while if not then the flow of control continues to the step S3.

When only the first illuminator button 3 is being depressed, then in the step S3 both the illuminators 1a and 2a for both of the display devices 1 and 2 are turned on for a predetermined time period, and then processing terminates. On the other hand, when the second illuminator button 8 is also depressed while the first illuminator button 3 is being depressed, then in the step S4 both the illuminators 1a and 2a for both of the display devices 1 and 2 are turned off, and then processing terminates.

If in the step S1 it is determined that the first illuminator button 3 is not being depressed, then the flow of control is transferred to the step S5, in which a decision is made as to whether or not the switch 8a is on, that is, as to whether or not the second illuminator button 8 is being depressed. If it is thus determined that (only) the second illuminator button 8 is being depressed, then the flow of control continues to the step S6, in which only the illuminator 2a for the viewfinder display device 2 is turned on for a predetermined time period, and then processing terminates. On the other hand, if in the step S5 it is determined that the second illuminator button 8 is not being depressed (either), then processing terminates directly.

As mentioned above and as shown in the FIG. 4 table, it is desirable (but not essential) that in this step S6 the illuminator 2a for the viewfinder display device 2 should be turned on more brightly, than was the case in the step S3.

Preferred Embodiment 2

In the first preferred embodiment of the present invention described above, when both the first illuminator button 3 and the second illuminator button 8 were depressed at the same time, both of the illuminators 1a and 2a for both of the display devices 1 and 2 were turned on together. However, in the second preferred embodiment of the present invention, such simultaneous operation of the first and second illuminator buttons 3 and 8 serves for changing over the brightness levels of the two illuminators 1a and 2a. The constructional details shown in FIGS. 1 through 3 for the first preferred embodiment are applicable to this second preferred embodiment, also, and accordingly the following explanation will refer to these figures as required.

Figure 6:
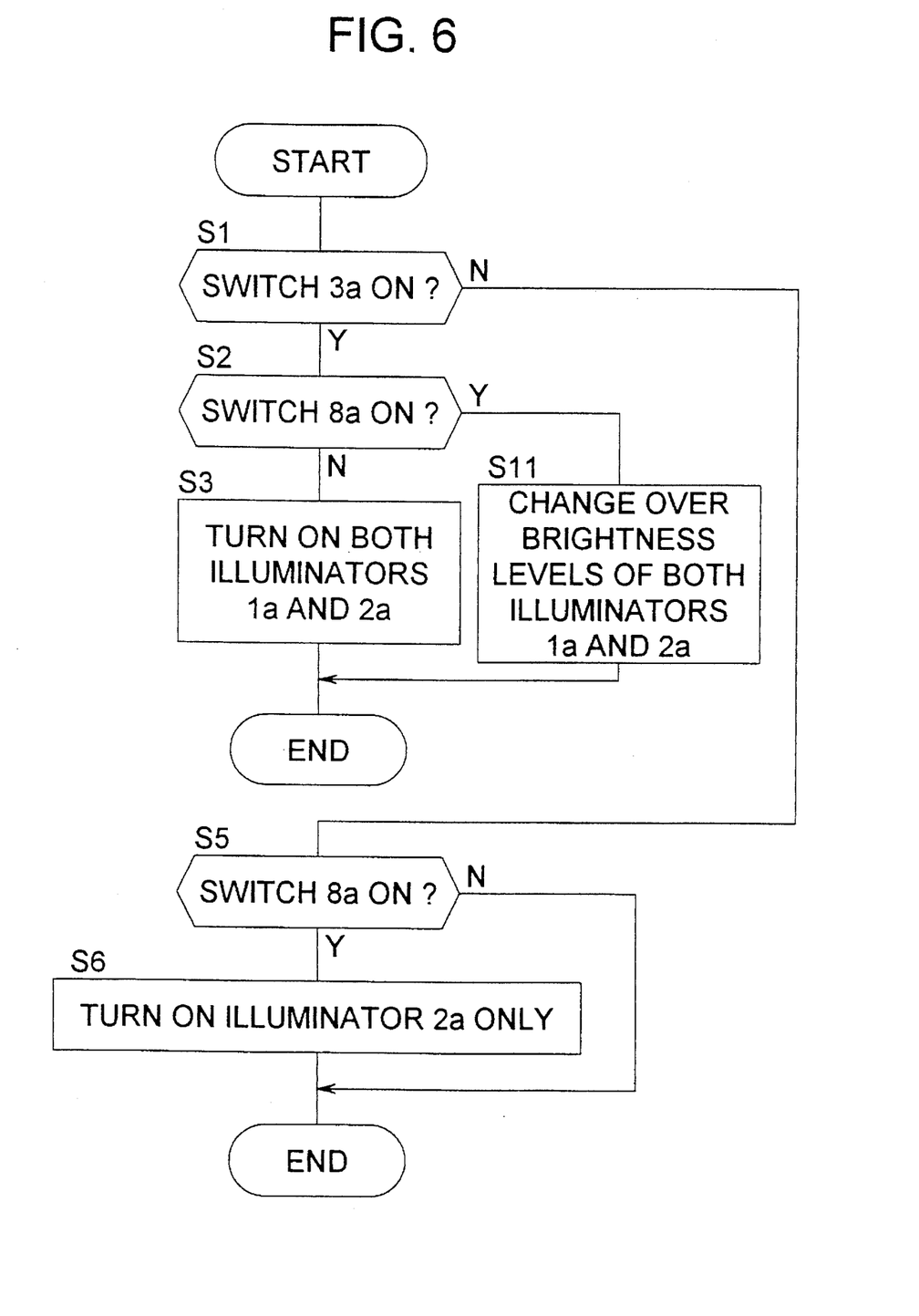
FIG. 6 is a flow chart, similar to FIG. 5 for the first preferred embodiment, showing the procedure followed by a control circuit for controlling the turning on and off and the brightness levels of two illuminators according to a second preferred embodiment of the display illumination device of the present invention.
Figure 7:
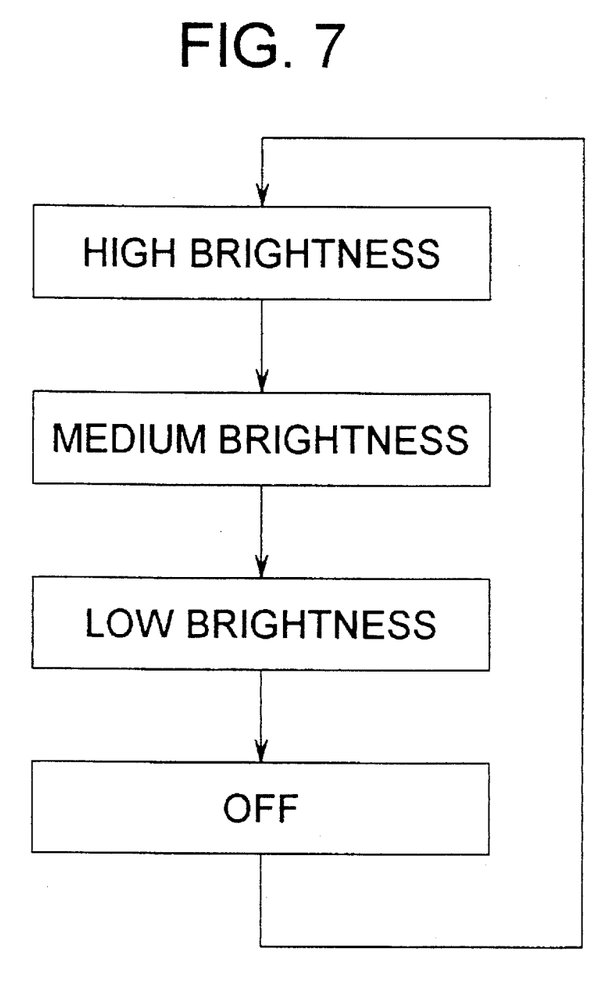
FIG. 7 is a schematic illustration showing a cycle according to which the brightness levels of these two illuminators are changed over, in this second preferred embodiment.

FIG. 6 is a flow chart, similar to FIG. 5 for the first preferred embodiment, showing the procedure followed by the control circuit in order to control the turning on and off of the two illuminators 1a and 2a, while FIG. 7 is a schematic illustration showing a cycle according to which the brightness levels of these two illuminators are changed over. The second preferred embodiment of the present invention will now be explained with reference to these flow charts. Steps in the FIG. 6 flow chart which are identical in function to steps of the FIG. 5 flow chart for the first preferred embodiment of the present invention are denoted by the same reference numerals, and their description will be curtailed in the interests of brevity.

When the second illuminator button 8 is also depressed while the first illuminator button 3 is being depressed, then in the step S11 the brightness levels of both of the two illuminators 1a and 2a for both of the displays 1 and 2 are changed over. In detail, each time that the second illuminator button 8 is depressed while the first illuminator button 3 is held depressed, the brightness levels of the two illuminators 1a and 2a are both cycled around the cycle, shown in FIG. 7, of high brightness, medium brightness, low brightness, and off. The current value for the brightness levels for the illuminators 1a and 2a, i.e. the current position in this cycle, is stored in a non volatile memory location, not particularly shown, of the control circuit 30, and is preserved while the illuminators are off, so as to be restored when next the illuminators are turned on again.

As an alternative it would also be acceptable, each time that both of the first and second illuminator buttons 3 and 8 were depressed together, to turn on both of the two illuminators 1a and 2a for both of the displays 1 and 2 at a brightness level determined according to the amount of power remaining in the battery 31. For example, the voltage of the battery 31 could be sensed and the amount of power remaining therein determined according to this voltage, and the two illuminators 1a and 2a could be turned on at a brightness level determined in accordance with this remaining amount of power.

Further, as another alternative, it would also be acceptable to set custom functions specific to the photographer according to the order in which the first and second illuminator buttons 3 and 8 were operated. For example, it could be so arranged that, if first the first illuminator button 3 is pressed once, next the second illuminator button 8 is pressed twice, and finally again the first illuminator button 3 is pressed once, then a one minute interval for illumination of the two illuminators 1a and 2a is chosen from among a set of previously arranged time intervals, and thereafter, when the first and second illuminator buttons 3 and 8 are operated, the two illuminators 1a and 2a are turned on for this one minute interval. It would also be acceptable, as yet another exemplary alternative, for this custom function setting mode to be set when the main power switch of the camera is turned on while the first illuminator button 3 is being depressed.

Although, as described above, the pair of first and second illuminator buttons 3 and 8 fulfilled the function of a plurality of control members in the first and second preferred embodiments of the present invention, this is not to be considered as limitative of the present invention: the number of buttons utilized for turning the illuminators on and off, or for controlling their brightness level or levels, need not be limited to two. For example, in addition to the operation of the first and second illuminator buttons 3 and 8 as control members for turning the illuminators 1a and 2a on and off, it would also be acceptable, as a variation, for the illuminator 2a for the viewfinder display device 2, only, to be turned on, each time the shutter release button 4 was depressed as far as its first stroke position.

Preferred Embodiment 3

A third preferred embodiment of the present invention will now be described, in which the illuminators 1a and 2a for the display devices 1 and 2 are turned on and off, and their brightness levels when they are turned on are controlled, based upon the manner in which the first illuminator button 3 and the second illuminator button 8 are operated, and also upon the results of the photometry which is performed by the photometric device 32. The constructional details shown in FIGS. 1 through 3 for the first preferred embodiment are applicable to this third preferred embodiment, also, and accordingly the following explanation will refer to these figures as required.

Figure 8:
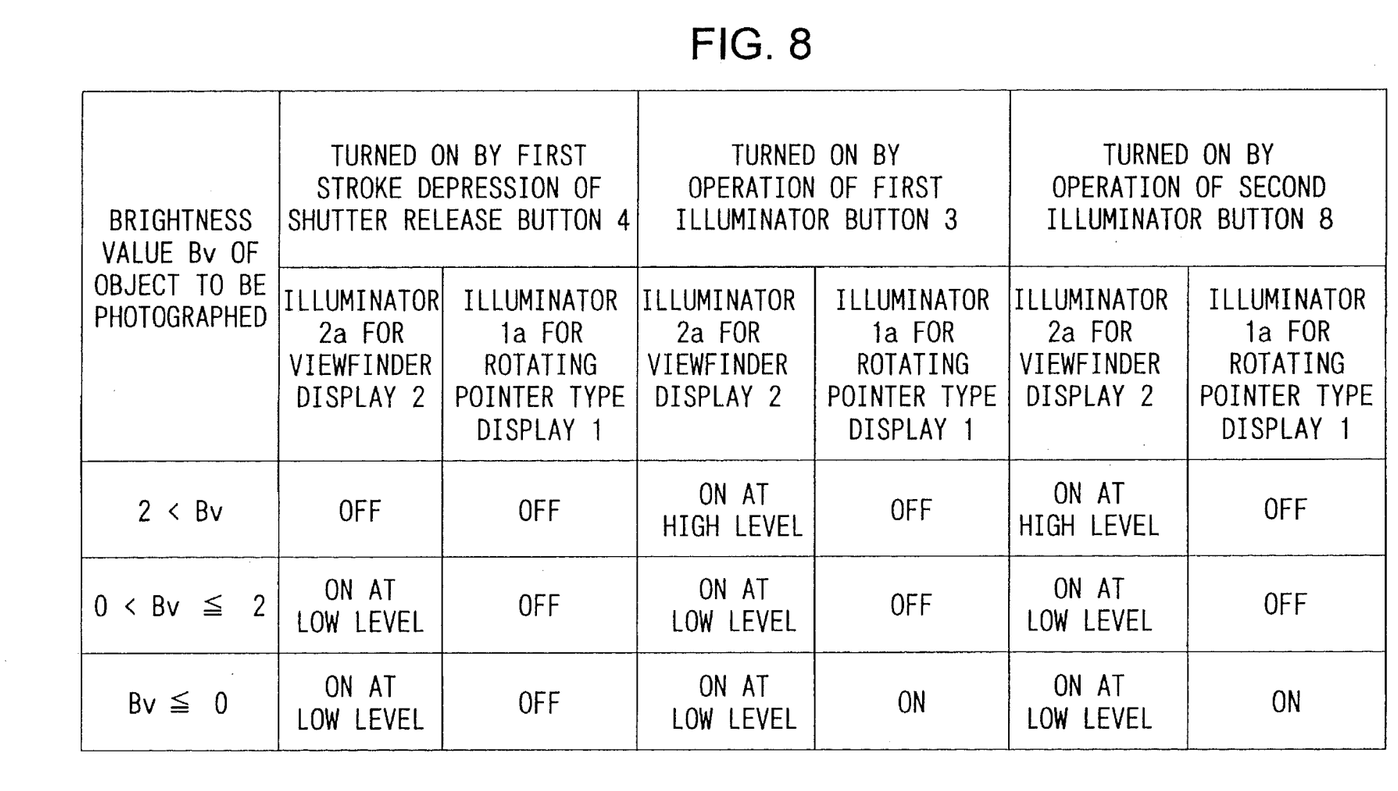
FIG. 8 is a table, similar to FIG. 4 for the first preferred embodiment, showing how the on/off states of two illuminators and the brightness level of one of them depend upon the operation of first and second illuminator buttons and of a shutter release button, and upon the results of photometry performed by a photometric device, in the operation of a third preferred embodiment of the display illumination device of the present invention.

FIG. 8 is a table, similar to FIG. 4 for the first preferred embodiment, showing, in the operation of this third preferred embodiment, how the two illuminators 1a and 2a are turned on and off, and how the brightness level of the illuminator 2a is regulated, in dependence upon the operation of the first and second illuminator buttons 3 and 8 and of the shutter release button 4 and upon the results of the photometry performed by the photometric device 32. Although as shown in FIG. 8 the patterns for turning on and off the two illuminators 1a and 2a and for regulating the brightness of the illuminator 2a, in this third preferred embodiment, are identical in the two cases of depression of the first illuminator button 3 and depression of the second illuminator button 8, this is not to be considered as limitative of the present invention, since in a variant embodiment these operational patterns could be different from one another. Further, the pattern shown in FIG. 8 for turning on and off the illuminators 1a and 2a is not to be considered as limited to this third preferred embodiment.

Since it is likely that the user of the camera is looking through the viewfinder 20 when the shutter release button 4 is depressed as far as its first stroke position, therefore it is assumed that it is not necessary to illuminate the rotating indicator pointer type display device 1 at this time, and accordingly the illuminator 1a therefor is not turned on. Moreover, as shown in the FIG. 8 table, if at this time the brightness level Bv of the object to be photographed is greater than 2, then it is considered that the amount of external light which is being taken in through the light intake window of the viewfinder 20 is sufficient for illuminating the viewfinder display device 2, and accordingly the illuminator 2a for the viewfinder display device 2 is not turned on. However, if the brightness level Bv of the object to be photographed is less than or equal to 2, then the illuminator 2a is turned on at a low brightness level. Moreover, after the shutter release button 4 is released, this automatic turning on which has been initiated by the operation of the shutter release button 4 is only continued for a time period set by a timer T1 (not particularly shown). This timer T1 starts timing from the time point at which the first stroke operation of the shutter release button 4 is terminated, and the time period thereof may for example be set to be six seconds. Further, when the flash prevention button 12 is pressed in order to set the flash prevention mode in which the flash device 11 is prevented from operating, the turning on of both of the illuminators 1a and 2a by the operation of the shutter release button 4 is prevented.

On the other hand, when either the first illuminator button 3 or the second illuminator button 8 is depressed, the illuminator 1a for the rotating indicator pointer type display device 1 is only turned on if the brightness level Bv of the object to be photographed is less than or equal to 0, in which case it is considered that the ambient light level is very low. Further, if the brightness level Bv of the object to be photographed is greater than 2, then it is considered that the ambient light level is very high, and accordingly the illuminator 2a for the viewfinder display device 2 is turned on at a high brightness level; while, if the brightness level Bv is less than or equal to 2, the illuminator 2a is turned on at a low brightness level. When one or both of the illuminators 1a and 2a is manually turned on as described above by the operation of the button 3 or the button 8, this illumination is continued for a time period set on a timer T2 (not particularly shown in the figures). This timer T2 is started when the button 3 or the button 8 is pressed, and its time period may for example be set to be the same as the timer period of the timer T1 described earlier (six seconds) or may be set to be a somewhat longer time period.

Figure 9A:
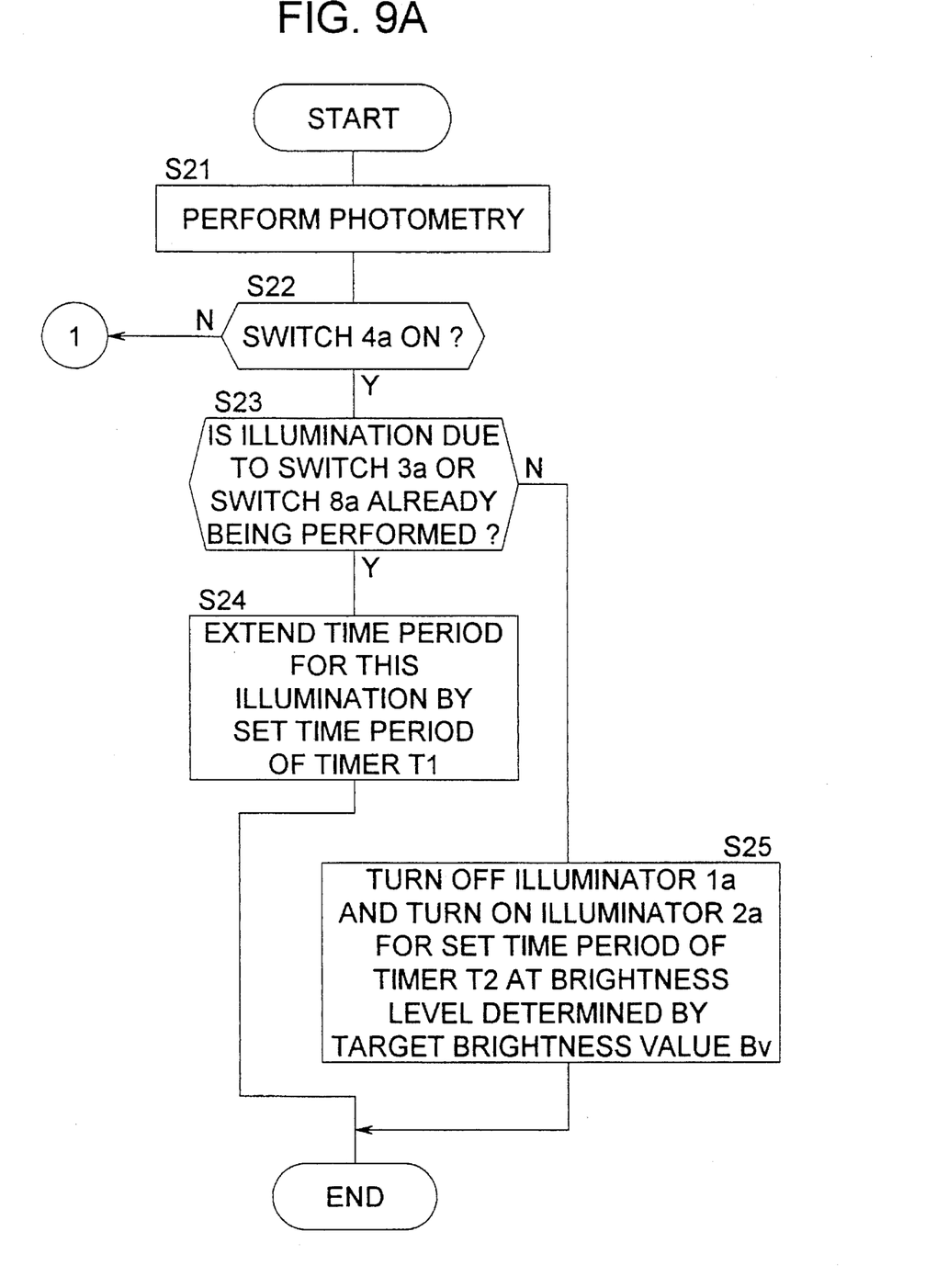
FIGS. 9A and 9B are flow charts together showing the procedure followed by a control circuit for controlling the turning on and off of these illuminators and the brightness level of one of them, according to this third preferred embodiment of the present invention.
Figure 9B:
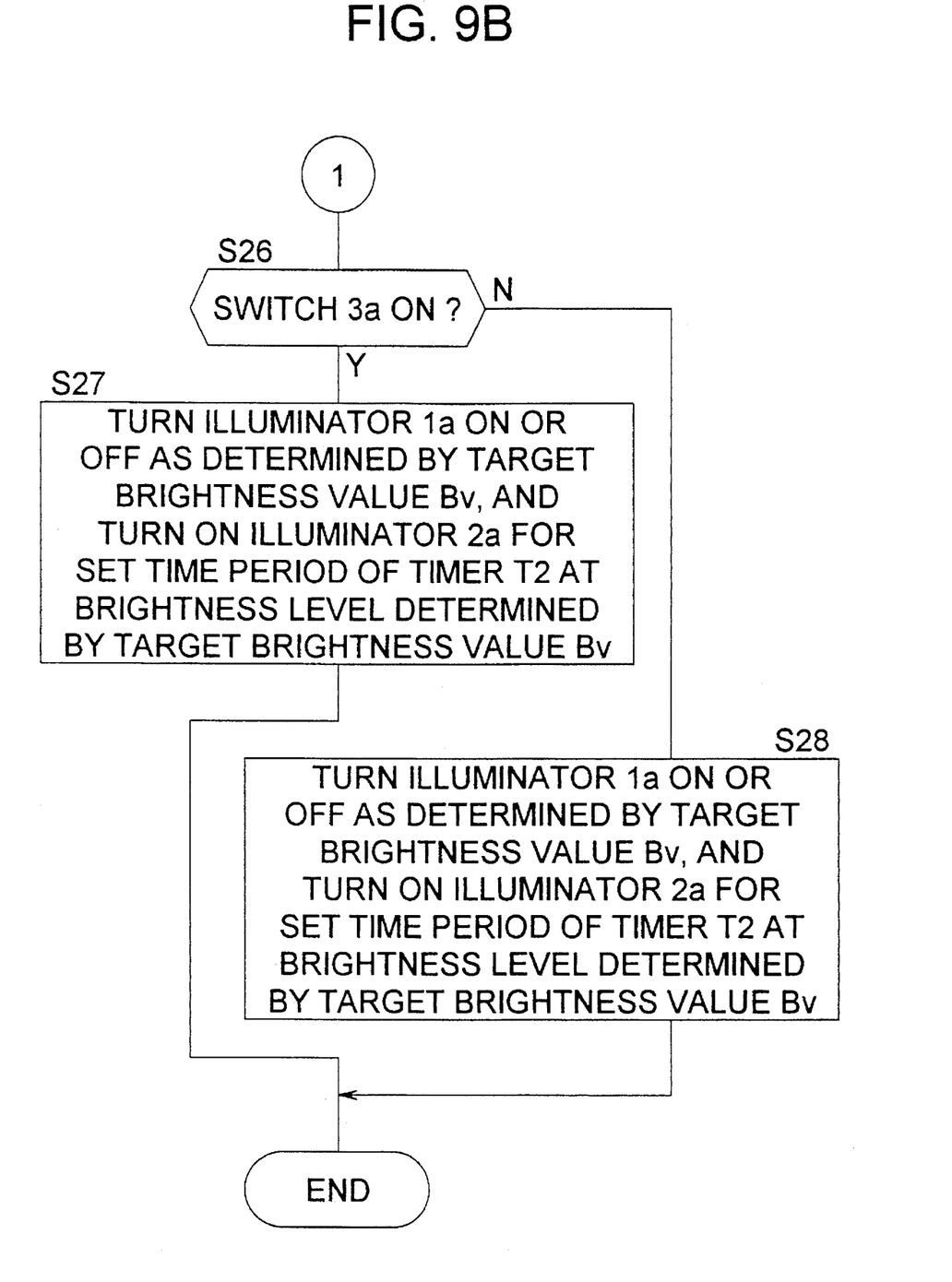

FIGS. 9A and 9B together constitute a flow chart for this third preferred embodiment of the present invention, showing the procedure followed by the control circuit in order to control the turning on and off of the two illuminators 1a and 2a. The third preferred embodiment will now be explained with reference to these flow charts.

The microcomputer incorporated in the control circuit 30 starts to execute the control program whose flow charts are shown in FIGS. 9A and 9B when any one of the switches 3a, 4a, or 8a is turned on. In the step S21 the photometric device 32 is actuated so as to perform photometry, and thereby the target brightness value Bv representing the intensity of the light from the object to be photographed is obtained. In the next step S22, a decision is made as to whether or not the switch 4a is on, that is, as to whether or not the shutter release button 4 is being depressed as far as its first stroke position. If the shutter release button 4 is being first stroke depressed, then the flow of control continues to the step S23, while if not then the flow of control is transferred to the step S26 of the FIG. 9B flow chart. When the shutter release button 4 has been first stroke depressed, then in the step S23 a decision is made as to whether or not illumination operation due to the operation of the switch 3a or the switch 8a is already being performed, i.e. as to whether or not the timer T1 is already operating to measure its set time period, having previously been started by operation of the first illuminator button 3 or of the second illuminator button 8. If such illumination action is already taking place, then the flow of control is transferred to the step S24, while if not then the flow of control is transferred to the step S25.

As shown in the FIG. 8 table, the pattern of illumination of the illuminators 1a and 2a initiated by the first stroke operation of the shutter release button 4 is different from the pattern of illumination thereof initiated by the operation of the first illuminator button 3 or the second illuminator button 8. However if illumination of the illuminators 1a and 2a initiated by the operation of the first illuminator button 3 or the second illuminator button 8 is already being performed at the time point that the shutter release button 4 is depressed through its first stroke, then in the step S24 the pattern of illumination of the illuminators 1a and 2a thus initiated by the operation of the first illuminator button 3 or the second illuminator button 8 is continued, and the time period therefor is extended by the set time period of the timer T1; and then processing terminates.

On the other hand, if illumination of the illuminators 1a and 2a initiated by the operation of the first illuminator button 3 or the second illuminator button 8 is not being performed at the time point that the shutter release button 4 is depressed through its first stroke, then in the step S25, as shown in the FIG. 8 table, the illuminator 1a for the rotating indicator pointer type display device 1 is turned off, and the illuminator 2a for the viewfinder display device 2 is turned on at a brightness level determined by the brightness level Bv of the object to be photographed for the time period set on the timer T2; and then processing terminates.

If in the step S22 it is determined that the shutter release button 4 is not being first stroke depressed, then the flow of control is transferred to the step S26 of the FIG. 9B flow chart, in which a decision is made as to whether or not the switch 3a is on, that is, as to whether or not the first illuminator button 3 is being depressed. If the first illuminator button 3 is being depressed, then the flow of control continues to the step S27, while if not then the flow of control is transferred to the step S28. When the first illuminator button 3 is being depressed, then in the step S27, as shown in the FIG. 8 table, the illuminator 1a for the rotating indicator pointer type display device 1 is turned on or off according to the brightness level Bv of the object to be photographed, and the illuminator 2a for the viewfinder display device 2 is turned on for the time period set on the timer T2 at a brightness level determined by the brightness level Bv of the object to be photographed; and then processing terminates. On the other hand, if in the step S26 it is determined that the first illuminator button 3 is not being depressed, therefore (by elimination) it must have been depression of the second illuminator button 8 which caused the starting of the execution of the program whose flow charts are shown in FIGS. 9A and 9B, and in the step S28, as shown in the FIG. 8 table, the illuminator 1a for the rotating indicator pointer type display device 1 is turned on or off according to the brightness level Bv of the object to be photographed, and the illuminator 2a for the viewfinder display device 2 is turned on for the time period set on the timer T2 at a brightness level determined by the brightness level Bv of the object to be photographed; and then processing terminates. Although in this third preferred embodiment of the present invention the patterns for turning on and off the two illuminators 1a and 2a and for regulating the brightness of the illuminator 2a initiated by the operation of the first illuminator button 3 and initiated by the operation of the second illuminator button 8 are the same, so that the actual content of the steps S27 and S28 is the same in this particular case, it should be understood this is not limitative of the present invention; in a variant embodiment these operational patterns could be different from one another, in which case these two steps S27 and S28 would not be identical.

It will be thus seen that, at the time point when the first illuminator button 3 or the second illuminator button 8 is depressed, if already the illuminators 1a and 2a are being operated by previous depression of the shutter release button 4, the pattern of this turning on and off the two illuminators 1a and 2a and of regulating the brightness of the illuminator 2a previously initiated by this depression of the shutter release button 4 (as set in the step S25 in a previous iteration of the program of FIGS. 9A and 9B, and as specified in the first two columns of the FIG. 8 table) is abandoned in favor of the new pattern initiated by the operation of the first illuminator button 3 or initiated by the operation of the second illuminator button 8 (as set in the step S27 or S28 and as specified in the third and fourth, or fifth and sixth respectively, columns of the FIG. 8 table); and this new pattern of illumination control for the two illuminators 1a and 2a is maintained for the set time period of the timer T2. This is in contrast to what was done in the step S24 described above, in which case, if at the time point when the shutter release button 4 is depressed, if already the illuminators 1a and 2a are being operated by previous depression of the first illuminator button 3 or the second illuminator button 8, the previous pattern of their illumination is maintained, and the time period therefor is merely extended by the set time period of the timer T2.

Various particular modifications of the operation of any of the above described embodiments of the present invention can be conceived of, without departing from the principles thereof. Accordingly, although the present invention has been shown and described in terms of several preferred embodiments thereof, it is not to be considered as limited by any of the perhaps quite fortuitous details of said embodiments or of the drawings, but only by the terms of the appended claims, which follow.

We claim:

1. A display illumination device for a camera which comprises a plurality of display devices which display information related to photography, comprising:

a plurality of illuminators, provided in correspondence to said display devices, which illuminate said display devices;

a plurality of illuminator control buttons for turning on and off said illuminators; and:

a control device which controls said plurality of illuminators according to the operation of said plurality of illuminator control buttons and turns off all of said plurality of illuminators when at least two among said plurality of illuminator control buttons are operated simultaneously.

2. A display illumination device for a camera according to claim 1, wherein said plurality of display devices includes a rotating indicator pointer type display device provided on a surface of said camera and a viewfinder display device provided within a viewfinder of said camera.

3. A display illumination device for a camera according to claim 2, wherein said plurality of illuminator control buttons includes a first button provided near said rotating indicator pointer type display device and a second button provided near a grip portion of said camera.

4. A display illumination device for a camera according to claim 1, wherein said control device sets any one from among a plurality of functions of said camera, according to the manner of operation of at least two from among said plurality of illuminator control buttons.

5. A display illumination device for a camera according to claim 1, said camera further comprising a photometric device which detects the brightness of an object to be photographed, wherein said control device controls the turning on and off of said plurality of illuminators based upon the operation of said plurality of illuminator control buttons and upon the brightness of the object to be photographed as detected by said photometric device.

6. A display illumination device for a camera according to claim 1, said camera further comprising a photometric device which detects the brightness of an object to be photographed, wherein, when said illuminators are turned on, said control device controls the brightness level thereof based upon the operation of said plurality of illuminator control buttons and upon the brightness of the object to be photographed as detected by said photometric device.

7. A display illumination device for a camera which comprises a plurality of display devices which display information related to photography, comprising:

a plurality of illuminators, provided in correspondence to said display devices, which illuminate said display devices;

a plurality of illuminator control buttons for turning on and off said illuminators; and a control device which controls said plurality of illuminators according to the operation of said plurality of illuminator control buttons, and, when a second one of said plurality of illuminator control buttons is operated while a first one of said plurality of illuminator control buttons is being operated, said control device switches over the brightness levels at which said plurality of illuminators are illuminated upon each operation of said second illuminator control button.

8. A display illumination device for a camera according to claim 7, wherein said plurality of display devices includes a rotating indicator pointer type display device provided on a surface of said camera and a viewfinder display device provided within a viewfinder of said camera.

9. A display illumination device for a camera according to claim 8, wherein said plurality of illuminator control buttons includes a first button provided near said rotating indicator pointer type display device and a second button provided near a grip portion of said camera.

10. A display illumination device for a camera according to claim 7, wherein said control device sets any one from among a plurality of functions of said camera, according to the manner of operation of at least two from among said plurality of illuminator control buttons.

11. A display illumination device for a camera which comprises a plurality of display devices which display information related to photography, comprising:

a plurality of illuminators, provided in correspondence to said display devices, which illuminate said display devices;

a plurality of illuminator control buttons for turning on and off said illuminators;

a battery of the camera;

a detector to detect the amount of electrical power remaining in said battery; and a control device which controls said plurality of illuminators according to the operation of said plurality of illuminator control buttons, and, when at least two among said plurality of illuminator control buttons are operated simultaneously, said control device illuminates said plurality of illuminators at brightness levels determined according to the amount of electrical power remaining in said battery as detected by said detector.

12. A display illumination device for a camera according to claim 11, wherein said plurality of display devices includes a rotating indicator pointer type display device provided on a surface of said camera and a viewfinder display device provided within a viewfinder of said camera.

13. A display illumination device for a camera according to claim 12, wherein said plurality of illuminator control buttons includes a first button provided near said rotating indicator pointer type display device and a second button provided near a grip portion of said camera.

14. A display illumination device for a camera according to claim 11, wherein said control device sets any one from among a plurality of functions of said camera, according to the manner of operations of at least two from among said plurality of illuminator control buttons.

* * * * *